(12) United States Patent
Nagahashi et al.

(10) Patent No.: US 9,157,365 B2
(45) Date of Patent: Oct. 13, 2015

(54) INTERNAL COMBUSTION ENGINE WITH BALANCER

(75) Inventors: Yoshiki Nagahashi, Wako (JP); Kazuya Tajiri, Wako (JP); Fumiaki Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 13/552,967

(22) Filed: Jul. 19, 2012

(65) Prior Publication Data

US 2013/0025558 A1   Jan. 31, 2013

(30) Foreign Application Priority Data

Jul. 26, 2011   (JP) ................. 2011-162876

(51) Int. Cl.
| | |
|---|---|
| F02B 75/06 | (2006.01) |
| F16F 15/26 | (2006.01) |
| F02B 67/00 | (2006.01) |
| F02B 75/20 | (2006.01) |
| F02B 61/02 | (2006.01) |

(52) U.S. Cl.
CPC .............. *F02B 75/06* (2013.01); *F16F 15/264* (2013.01); *F02B 61/02* (2013.01); *F02B 67/00* (2013.01); *F02B 75/20* (2013.01); *F16F 15/265* (2013.01)

(58) Field of Classification Search
CPC ....... F16F 15/264; F16F 15/265; F02B 75/20; F02B 75/06; F02B 67/00
USPC ...................................................... 123/192.2
See application file for complete search history.

(56) References Cited

U.S. PATENT DOCUMENTS

| | | | | |
|---|---|---|---|---|
| 2,298,408 A | * | 10/1942 | Moyer | ............................ 29/259 |
| 3,961,614 A | * | 6/1976 | Rameau | ..................... 123/195 A |
| 5,992,393 A | * | 11/1999 | Yoshida et al. | ................ 123/509 |

(Continued)

FOREIGN PATENT DOCUMENTS

| | | |
|---|---|---|
| CN | 201166087 Y | 12/2008 |
| EP | 1445509 A1 | 8/2004 |

(Continued)

OTHER PUBLICATIONS

Motofool, How to Align Balance Shaft, Jun. 9, 2012, Ninjette.org, pp. 1-2.*
Motofool, Aligned Balance Shaft with Crankshaft of EX-250 H2 1992 Ninja 250 Engine, Jun. 9, 2012, Ninjette.org, p. 1.*

*Primary Examiner* — Lindsay Low
*Assistant Examiner* — Charles Brauch
(74) *Attorney, Agent, or Firm* — Rankin, Hill & Clark LLP (57) ABSTRACT

In an internal combustion engine with a balancer including a crankcase having a pair of wall portions, a crankshaft supported for rotation on the wall portions and having a balancer driving gear wheel provided thereon, and a balancer shaft supported for rotation by the wall portions and having a balancer driven gear wheel provided thereon, both gear wheels are disposed between the wall portions. A positioning mark including a set of marks provided on side faces in the same direction of the gear wheels is disposed near to pitch circles of both gear wheels. At a position opposing to both side faces of the one wall portion on the side opposing to the positioning mark on the pitch circles of both gear wheels, a through-hole extending through the one side wall is provided to permit the positioning mark to be visually observed through the through-hole.

8 Claims, 10 Drawing Sheets

(56) References Cited

U.S. PATENT DOCUMENTS

| | | |
|---|---|---|
| 6,213,072 B1 * | 4/2001 | Sayama et al. ............ 123/90.31 |
| 6,382,168 B1 * | 5/2002 | Sayama et al. ............ 123/195 C |
| 6,904,884 B2 * | 6/2005 | Utsumi ...................... 123/192.2 |
| 2010/0018105 A1 * | 1/2010 | Gauker et al. .................... 43/81 |

FOREIGN PATENT DOCUMENTS

| | | |
|---|---|---|
| JP | 08-100836 A | 4/1996 |
| JP | 3440573 | 6/2003 |

\* cited by examiner

INTERNAL COMBUSTION ENGINE WITH BALANCER

BACKGROUND OF THE INVENTION

1. Field of the Invention

The present invention relates to an internal combustion engine with a balancer wherein confirmation of positioning in meshing between a driving gear wheel and a driven gear wheel of a balancer mechanism can be carried out easily.

2. Description of Related Art

In a conventional internal combustion engine, for example, where a crankshaft is oriented in a vehicle widthwise direction (leftward and rightward direction) when the conventional internal combustion engine is mounted on a vehicle, if a balancer mechanism having a driving gear wheel is disposed between left and right crank journal walls, then the meshing region between the driving gear wheel and a driven gear wheel for balancer driving is hidden by a pair of wall sections formed from the crank journal walls. Consequently, it is difficult to confirm alignment of "positioning marks" for adjusting the timings of the gear wheels (predetermined mutual phase).

As a countermeasure against the difficulty, for example, Japanese Patent No. 3440573 discloses an apparatus wherein a cutaway portion is provided on a crank web so that, when the balancer mechanism is assembled to the crankcase, the positioning marks in the meshing region of the driving gear wheel and the driven gear wheel can be confirmed from the opposite side of the crankcase.

However, since the internal combustion engine of Japanese Patent No. 3440573 is structured such that the crankcase is composed of two left and right parts, the meshing region of the gear wheels can be viewed directly from the opposite side of the crankcase to confirm alignment of the positioning marks. However, depending upon the form of the internal combustion engine, the meshing region may not be able to be viewed directly and alignment of the positioning marks may not be able to be readily confirmed.

Therefore, an internal combustion engine with a balancer wherein alignment of positioning marks in a meshing region of a balancer driving gear wheel and a balancer driven gear wheel of a balancer mechanism can be confirmed readily irrespective of the form of the internal combustion engine is needed.

SUMMARY OF THE INVENTION

In order to solve the subject described above, the present invention, according to one aspect, provides an internal combustion engine with a balancer including a crankcase having a pair of wall portions, a crankshaft supported for rotation by the wall portions and having a balancer driving gear wheel provided integrally thereon, and a balancer shaft supported for rotation by the wall portions and having a balancer driven gear wheel provided integrally thereon, wherein the balancer driving gear wheel and the balancer driven gear wheel are disposed between the wall portions and a positioning mark including a set of marks provided on side faces in the same direction of the gear wheels is disposed near to pitch circles of the balancer driving gear wheel and the balancer driven gear wheel, and at a position opposing to both side faces of the one wall portion on the side opposing to the positioning mark on the pitch circles of the balancer driving gear wheel and the balancer driven gear wheel, a through-hole extending through the one side wall is provided such that the positioning mark can be visually observed from the outside of the one side wall through the through-hole. Therefore, alignment of the positioning mark for adjusting the timings (predetermined phase relationship) of both of the balancer driving gear wheel and the balancer driven gear wheel to each other can be readily confirmed from the front through the through-hole irrespective of the form of the internal combustion engine. Consequently, assembly of the balancer mechanism is facilitated, and this contributes to accuracy in assembly and reduction in cost.

According to another aspect of the invention, a pitch circle diameter of the balancer driving gear wheel and a pitch circle diameter of the balancer driven gear wheel are equal to each other. Since the position of the through-hole is disposed at equal distances from the center of the crankshaft and the center of the balancer shaft, the through-hole is not one-sided to any of the supporting holes for the shafts and the rigidity of the crankcase is assured.

In accordance with another aspect of the invention, the crankcase is formed from upper and lower parts with respect to a parting face centered at the crankshaft, and the balancer shaft is supported on one of the upper side crankcase and the lower side crankcase in a displaced relationship from the parting face. Accordingly, the through-hole can be formed as a closed hole spaced away from the parting face of the crankcase, and since such a cutaway portion as in the case where the through-hole is provided on the parting face is not formed, rigidity of the crankcase is assured. Since the crankcase is not structured such that it is composed of two left and right parts, also in the case of a crankcase of a structure composed of two upper and lower parts with which there is the possibility that it may be difficult to confirm alignment of the positioning mark by directly observing the meshing region of the gear wheels from the opposite side of the crankcase, the present invention makes it possible to confirm alignment of the positioning mark by directly observing the meshing region between the balancer driving gear wheel and the balancer driven gear wheel.

Based upon a further aspect of the invention, an end of a female threaded hole for a fastening bolt for fastening the upper side crankcase and the lower side crankcase extends to the through-hole. Thus, upon working of the female thread, cut chips can be removed readily, and therefore, the working is facilitated. Further, stress concentration which occurs around an end portion of the fastening bolt is prevented, and this can contribute to enhancement of the strength of the crankcase.

According to another aspect of the invention, the through-hole is an elongated circle elongated along a circumferential direction of the pitch circles of the balancer driving gear wheel and the balancer driven gear wheel. Since the through-hole is formed as an elongated hole, the range within which the confirmation can be carried out increases.

According to another aspect of the invention, an outer periphery of the through-hole is surrounded by a rib. Accordingly, the outer periphery of the through-hole is reinforced, and contributes to enhancement of the crankcase strength.

According to another aspect of the invention, the rib that surrounds the outer periphery of the through-hole connects to a vertical rib that extends in an upward and downward direction of the one side wall around the outer periphery of the through-hole. Therefore, the rib around the through-hole can be further reinforced.

In further accordance with the present invention, the through-hole is formed by casting through. Since the through-hole is formed by casting through, mechanical working can be omitted and the man-hours required to make the crankcase decreases.

DETAILED DESCRIPTION OF THE PREFERRED EMBODIMENTS

An internal combustion engine with a balancer of an embodiment according to the present invention is described with reference to FIGS. 1 to 12.

It is to be noted that such directions as forward, rearward, leftward, rightward, upward and downward directions in the description of the present specification and the claims are represented with reference to the direction of a small size vehicle in a state in which the internal combustion engine with a balancer for a motorcycle according to the present embodiment is mounted on the vehicle.

Further, in the figures, an arrow mark FR denotes a forward direction of the vehicle, LH a leftward direction of the vehicle, RH a rightward direction of the vehicle, and UP an upward direction of the vehicle.

Figure 1:
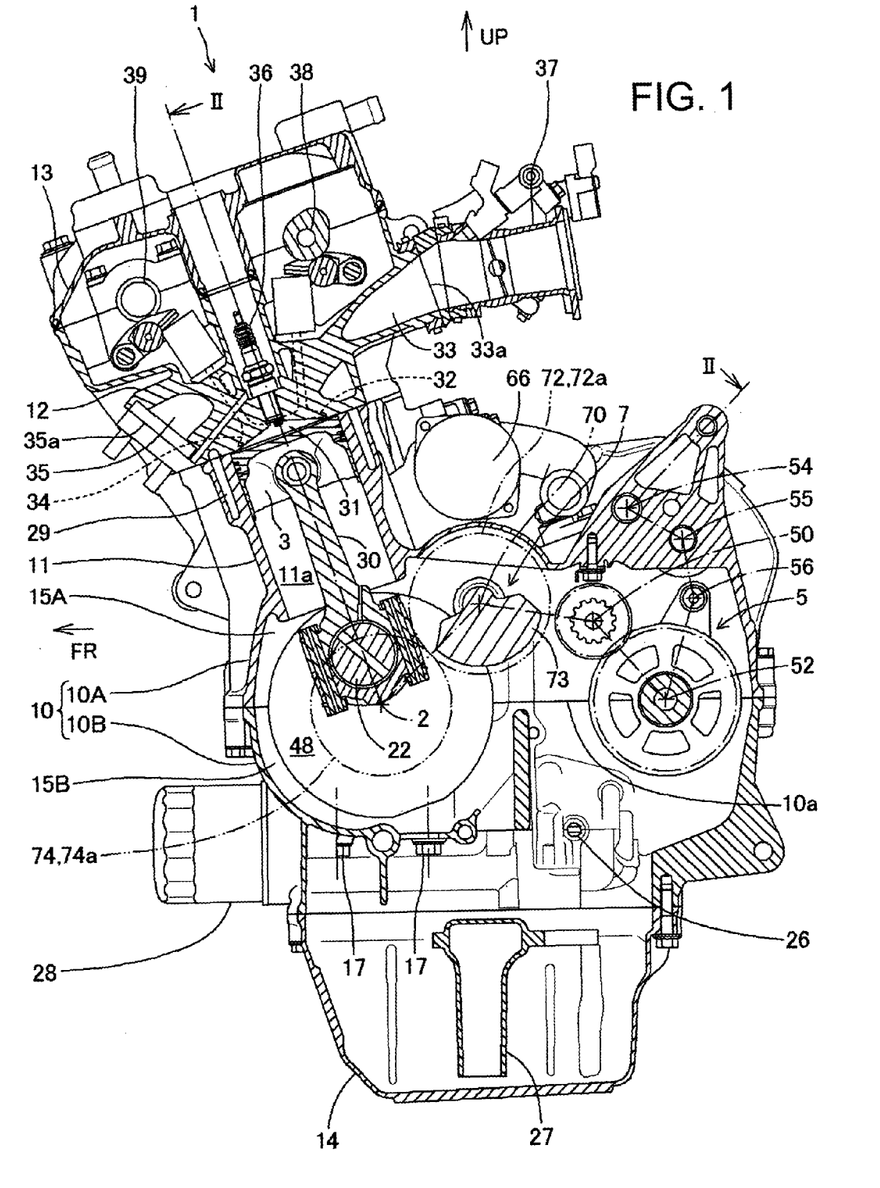
FIG. 1 is a left side sectional view of an internal combustion engine with a balancer for a motorcycle according to an embodiment of the present invention.

FIGS. 1 to 12 relate to an embodiment of the present invention, and in FIG. 1, an internal combustion engine with a balancer (hereinafter referred to as internal combustion engine 1) is shown in a posture in which it is mounted on a vehicle (not shown).

The internal combustion engine 1 according to the present embodiment is a water-cooled straight two-cylinder four-stroke cycle internal combustion engine mounted on a motorcycle (not shown), which is a vehicle on which the internal combustion engine 1 is mounted, with a crankshaft 2 thereof oriented in a vehicle widthwise direction of the motorcycle, that is, in the leftward and rightward direction.

As shown in FIG. 1, a crankcase 10 in which the crankshaft 2 is disposed in the vehicle widthwise direction and supported for rotation is formed in a two-part configuration in which it is configured from upper and lower divisional parts across a parting face 10a centered at the crankshaft 2. On the upper side crankcase 10A, a cylinder block 11 formed from two cylinder bores 11a arrayed in series (refer to FIG. 2) and formed integrally and a cylinder head 12 fastened to the cylinder block 11 are placed in order and provided uprightly in a rather forwardly inclined relationship. A cylinder head cover 13 is placed on and fastened to the cylinder head 12. An oil pan 14 is attached under the lower side crankcase 10B.

Figure 2:
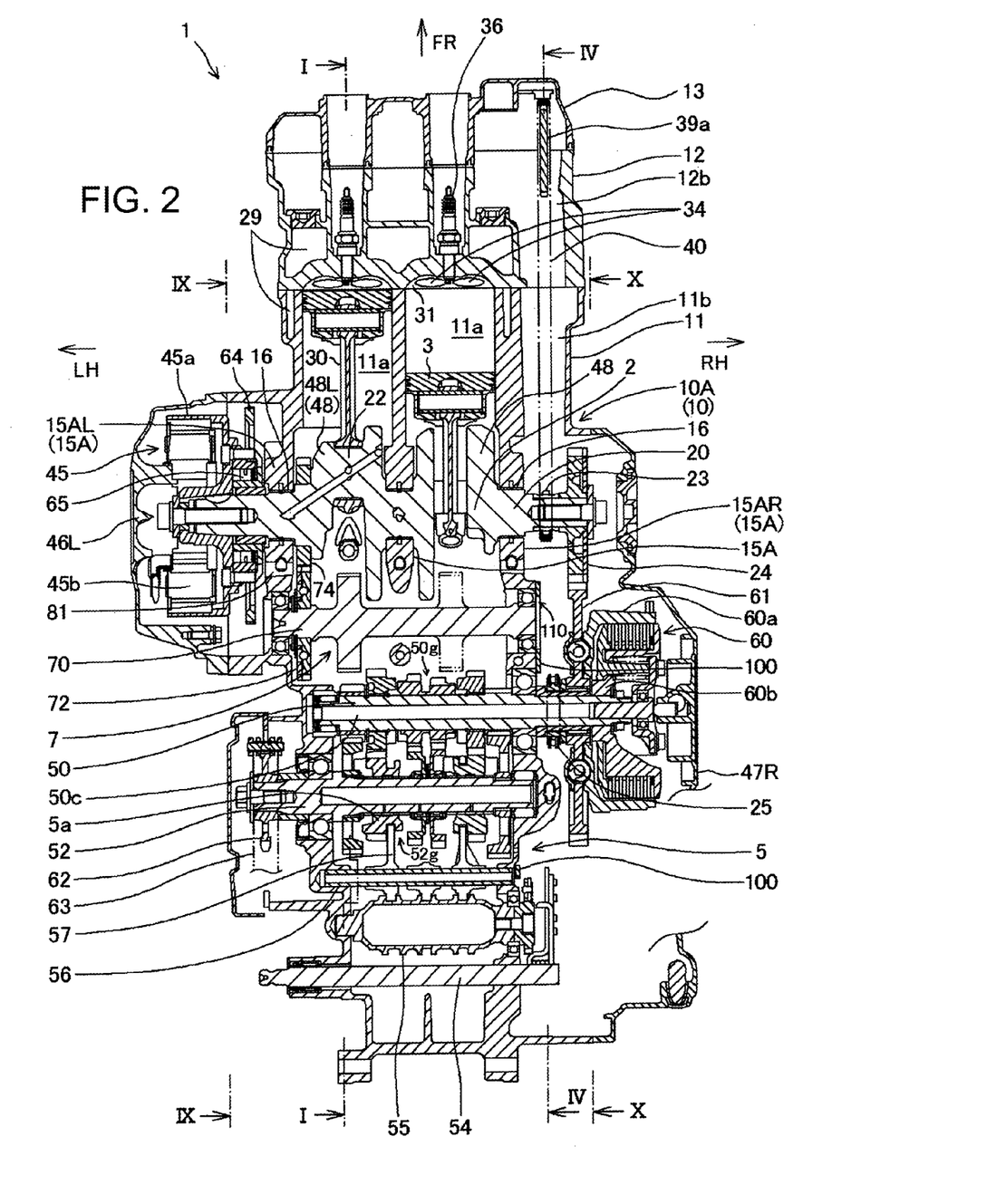
FIG. 2 is a sectional developed view of the internal combustion engine with a balancer taken along line II-II in FIG. 1. It is to be noted that FIG. 1 corresponds to a sectional view taken along line I-I in FIG. 2.

Referring to FIG. 2, journal walls 15A and 15B (A indicates the upper side and B indicates the lower side: this similarly applies in the following description. However, in FIG. 2, only the upper side journal wall 15A is shown as indicated by a development sectional line II-II in FIG. 1) support journal portions 20 of the crankshaft 2 for rotation in such a manner as to sandwich the same from above and below with a main bearings (journal bearings) 16 interposed therebetween.

Since the internal combustion engine 1 is of the series two-cylinder type, the crankshaft 2 has three journal portions 20 and is supported for rotation by three journal portions 20 in both of the upper side crankcase 10A and the lower side crankcase 10B. Of each three journal walls 15A and 15B, the left end side journal walls 15AL and 15BL and the right end side journal walls 15AR and 15BR (A indicates the upper side and the B indicates the lower side: this similarly applies also in the following description. It is to be noted that, in FIG. 2, only upper side ones are shown as described hereinabove) extend rearwardly with respect to the crankshaft 2 and configure a pair of left and right wall portions of the crankcase 10 such that they support not only the crankshaft 2 but also a main shaft 50 and a countershaft 52 of a speed change gear 5 disposed in the crankcase 10 rearwardly with respect to the crankshaft 2 and a balancer shaft 70 of a balancer mechanism 7 for rotation and in parallel to the crankshaft 2.

The upper side crankcase 10A and the lower side crankcase 10B are fastened integrally with each other by bolts with the parting faces 10a thereof put together.

In each three journal walls 15A and 15B in the upper side crankcase 10A and the lower side crankcase 10B, stud bolts ("fastening bolt" in the present invention (refer to FIG. 1)) 17 extend, in the front and rear sandwiching semicircular arcuate portions that configure three crankshaft supporting holes 2H (refer to FIGS. 3 and 9) that hold the crankshaft 2, straightly upwardly from below through the lower side crankcase 10B and are screwed into and tightened to elongated female threaded holes 18 (refer to FIG. 9) of the upper side crankcase 10A.

It is to be noted that the upper side crankcase 10A and the lower side crankcase 10B are fastened not only by the stud bolts 17 described hereinabove but also by a plurality of bolts 19 at required locations (refer to FIG. 4).

A piston 3 is fitted for back and forth sliding movement in a cylinder bore 11a of each of the two cylinders of the cylinder block 11 formed integrally on the upper side crankcase 10A. The piston 3 is connected to a crankpin portion 22 of the crankshaft 2 through a connecting rod 30.

As shown in FIG. 1, in the cylinder head 12, for each cylinder bore 11a, a combustion chamber 31 is formed in an opposing relationship to the piston 3; an intake port 33, which is open to the combustion chamber 31 and is opened and closed by a pair of intake valves 32, extends rearwardly; an exhaust port 35, which is opened and closed by a pair of exhaust valves 34, extends forwardly; and an ignition plug 36 facing the combustion chamber 31 is mounted.

It is to be noted that a throttle body 37 is connected to an upstream side opening 33a of the intake port 33, and an air cleaner is connected to the upstream of the throttle body 37 through an intake pipe (not shown). A muffler is connected to a downstream side opening 35a of the exhaust port 35 through an exhaust pipe (not shown).

Each intake valve 32 and each exhaust valve 34 are driven to open and close in synchronism with rotation of the crankshaft 2 by an intake camshaft 38 and an exhaust camshaft 39 supported for rotation on the cylinder head 12, respectively. To this end, cam sprocket wheels 38a and 39a are fitted at a right end portion of the camshafts 38 and 39, respectively, and a cam chain 40 extends between a driving sprocket wheel 23 fitted in the proximity of the right end portion of the crankshaft 2 and the cam sprocket wheels 38a and 39a (refer to FIGS. 2 and 4) such that the camshafts 38 and 39 are driven to rotate at a rotational speed equal to one half that of the crankshaft 2.

Figure 4:
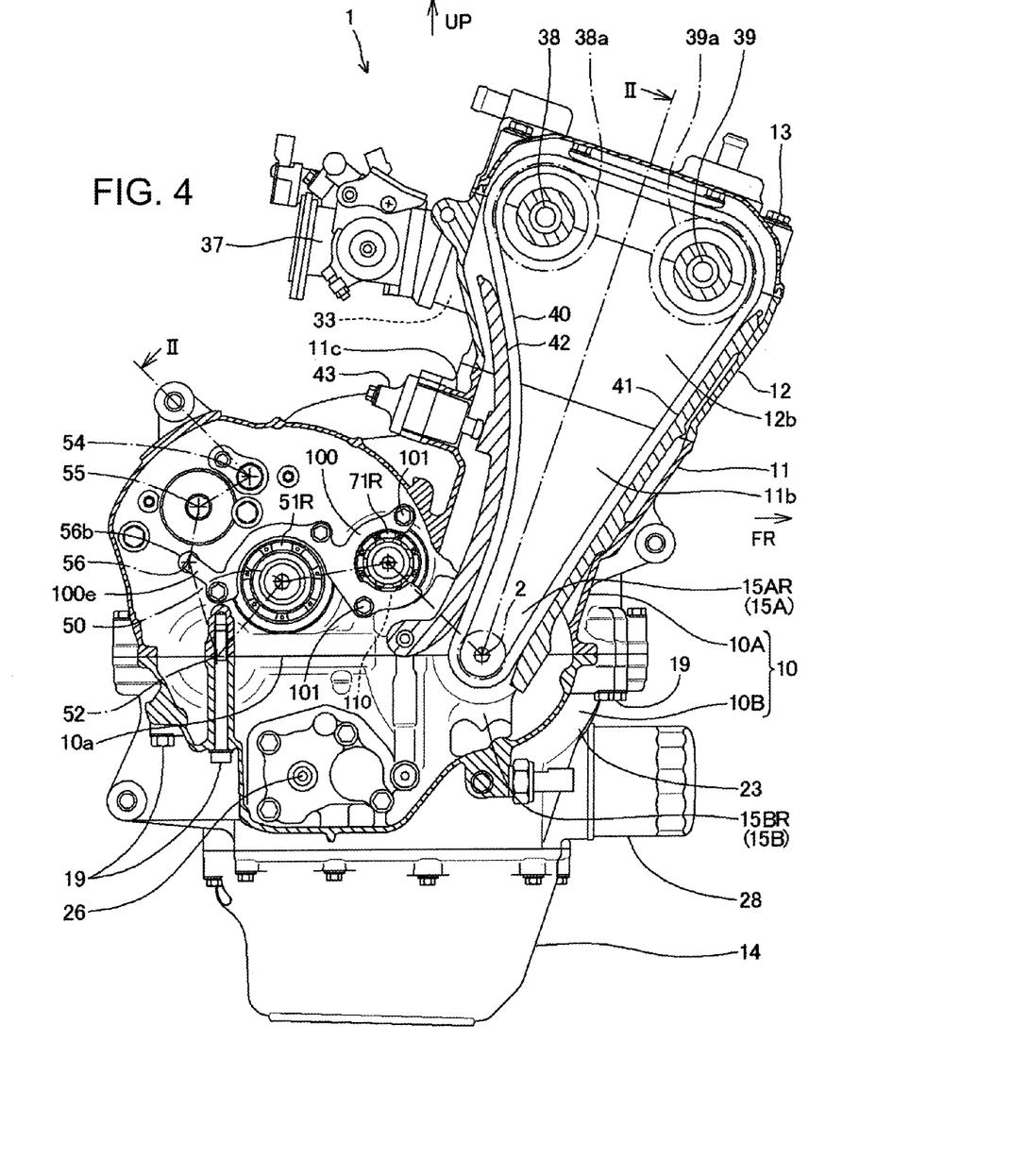
FIG. 4 is a right side sectional view of the internal combustion engine with a balancer taken along line IV-IV in FIG. 2. It is to be noted that FIG. 2 corresponds to a sectional developed view taken along line II-II in FIG. 4.

As shown in FIG. 4, cam chain chambers 11b and 12b for disposing the cam chain 40 therein are formed at a right end portion of the cylinder block 11 and the cylinder head 12 (refer to FIG. 2). In the cam chain chambers 11b and 12b, cam chain guides 41 and 42 are provided forwardly and rearwardly along the cam chain 40, respectively, and the rear side cam chain guide 42 presses the cam chain 40 under the bias by a cam chain tensioner 43 of the hydraulic pipe to apply suitable tension to the cam chain 40. The cam chain tensioner 43 is attached to a tensioner holder 11c that projects rearwardly from a rear face of a right end portion of the cylinder block 11.

On the other hand, as shown in FIG. 2, an outer rotor 45a of an ac generator 45 is fitted on a left end portion of the crankshaft 2 that projects leftwardly from the left end side journal walls 15AL and 15BL, which form a left side wall portion of the crankcase 10. The ac generator 45 is covered with a generator cover 46L, which is attached to the left end side journal walls 15AL and 15BL. An inner stator 45b having generator coils of the ac generator 45 is supported on the inner side of the generator cover 46L and disposed in the outer rotor 45a.

In the following, referring to FIG. 3, which is an enlarged view of a portion in FIG. 2 in which the shafts are supported for rotation on the crankcase 10, the speed change gear 5 is disposed rearwardly with respect to the crankshaft 2 in the crankcase 10. The speed change gear 5 is a gear wheel type speed change gear of the constant mesh type, and the main shaft 50 of the speed change gear 5 is supported for rotation at an obliquely upward position rearwardly of the crankshaft 2 (refer to FIG. 1) on the left end side journal wall 15AL and the right end side journal wall 15AR, which form a pair of wall portions, in the upper side crankcase 10A through a left bearing 51L and a right bearing 51R, respectively. In the present embodiment, the left bearing 51L is a needle bearing, and the right bearing 51R is a ball bearing.

Further, sandwiched between the parting faces 10a of the upper side crankcase 10A and the lower side crankcase 10B rearwardly of the crankshaft 2, the countershaft 52 is supported for rotation on the left end side journal walls 15AL and 15BL and the right end side journal walls 15AR and 15BR, which form a pair of wall portions, through a left bearing 53L and a right bearing 53R, respectively. In the present embodiment, the left bearing 53L is a ball bearing and the right bearing 53R is a needle bearing.

Speed change gear wheel groups 50g and 52g mounted on the main shaft 50 and the countershaft 52 parallel to the crankshaft 2 mesh at paired gear wheels thereof with each other, and gear wheel switching is carried out by a movement of a gear 5a, which is spline fitted with a shaft and serves as a shifter, by a speed changing operation mechanism to carry out speed change.

Figure 3:
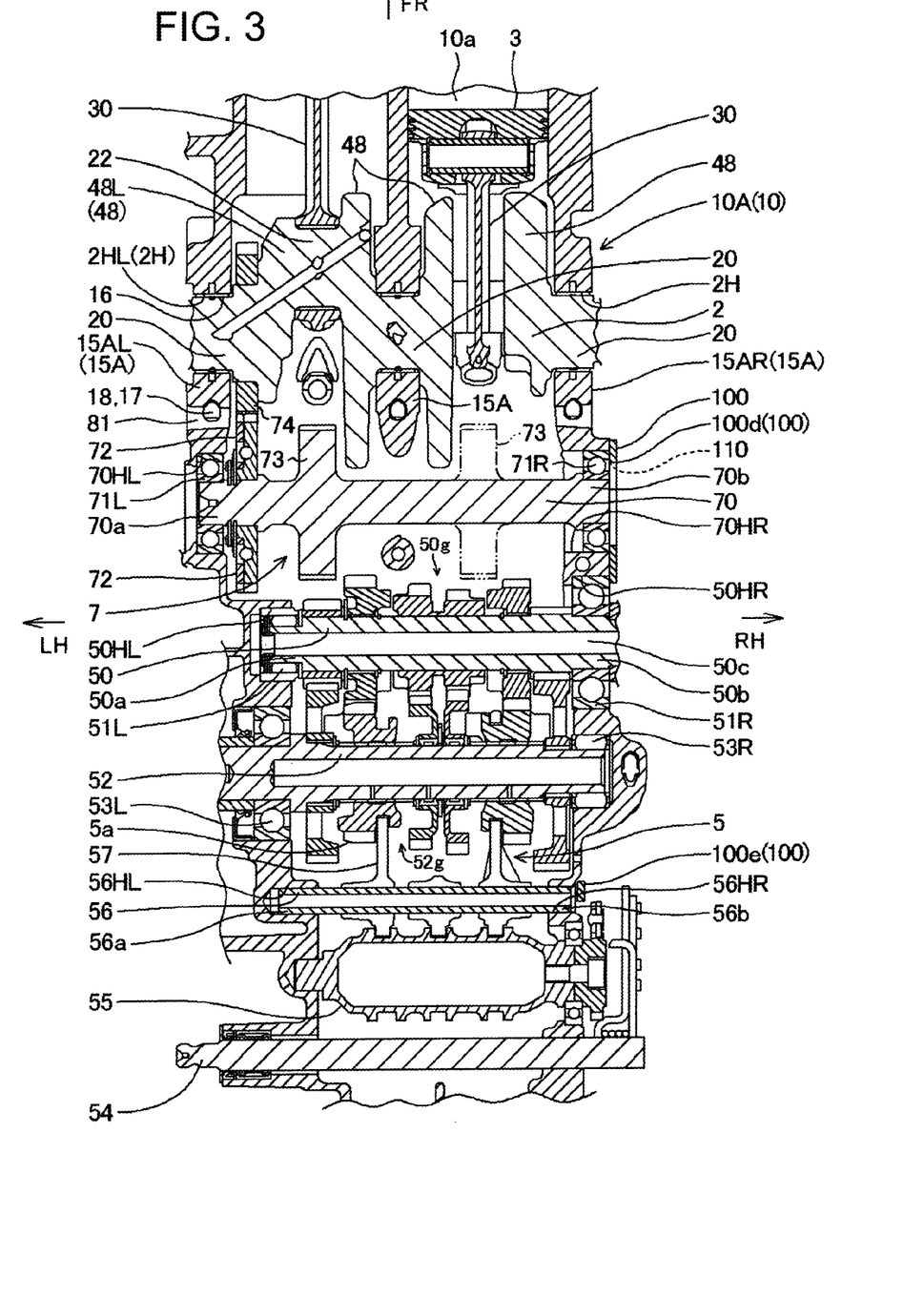
FIG. 3 is an enlarged view of a region in which shafts are supported for rotation on a crankcase.

In particular, referring to FIG. 3, if a shift spindle 54 supported for rotation on the left end side journal wall 15AL and the right end side journal wall 15AR, which serve as a pair of wall portions of the upper side crankcase 10A, is operated to rotate by an operator, then a shift drum 55 supported for rotation on the paired wall portions 15AL and 15AR is rotated to move a shift fork 57, which is supported for leftward and rightward sliding movement on a shift fork supporting shaft 56 supported on the paired wall portions 15AL and 15AR and engages on one end side thereof with the shift drum 55, leftwardly or rightwardly. The shift fork 57 engages on the other end side thereof with the gear 5a serving as a shifter in the speed change gear wheel groups 50g and 52g, and movement of the gear 5a serving as a shifter is carried out by the shift fork 57 to carry out speed change by a speed change operation mechanism, which is configured from the shift spindle 54, shift drum 55, shift fork 57 and so forth.

As shown in FIG. 2, a friction clutch 60 of the multi-plate type is provided at a right end portion of the main shaft 50, and a primary driven gear wheel 61 supported for rotation together with a clutch outer 60a of the friction clutch 60 and a primary driving gear wheel 24 secured to the right end of the crankshaft 2 mesh with each other to configure a primary speed reduction mechanism.

A clutch inner 60b, which is the output side of the friction clutch 60 is kept in spline fitting with the main shaft 50, and rotation of the crankshaft 2 is transmitted to the main shaft 50 through the primary speed reduction mechanism 24 and 61 and the friction clutch 60. The primary driving gear wheel 24 and the friction clutch 60 are covered on the right side thereof with a right crankcase cover 47R, and the right crankcase cover 47R is attached to the right end side journal walls 15AR and 15BR which serve as a right side wall portion of the crankcase 10.

In the friction clutch 60, rotational power of the crankshaft 2 is transmitted to the friction clutch 60 through the primary driving gear wheel 24 of the crankshaft 2 side and the primary driven gear wheel 61 of the friction clutch 60 side. The friction clutch 60 is configured such that, during gear change of the speed change gear 5, the friction clutch 60 establishes a neutral state without transmitting the rotational power of the crankshaft 2 to the speed change gear 5, but when the gear change of the speed change gear 5 comes to an end, the friction clutch 60 transmits the rotational power of the crankshaft 2 to the speed change gear 5.

Rotation of the main shaft 50 is transmitted to the countershaft 52 through meshing engagement between the speed change gear wheel groups 50g and 52g. The countershaft 52 serves also as an output power shaft, and an output sprocket wheel 62 is fitted at a left end portion of the countershaft 52, which extends leftwardly through the crankcase 10 and projects to the outside, and a power transmission chain 63 is stretched between the output sprocket wheel 62 and a driven sprocket wheel of a rear wheel (not shown) to configure a secondary speed reduction mechanism. Power is transmitted to the rear wheel through the secondary speed reduction mechanism.

As shown in FIG. 2, a starting driven gear wheel 64 is supported for rotation on the outer rotor 45a of the ac generator 45 secured to the left end of the crankshaft 2 with a one-way clutch 65 interposed therebetween. A starter motor 66 (refer to FIG. 1) for starting the internal combustion engine 1 is attached to a position on an upper face at a mid portion of the crankcase 10 as seen from a starter motor attachment hole 66H of the upper side crankcase 10A shown in FIG. 9.

Figure 9:
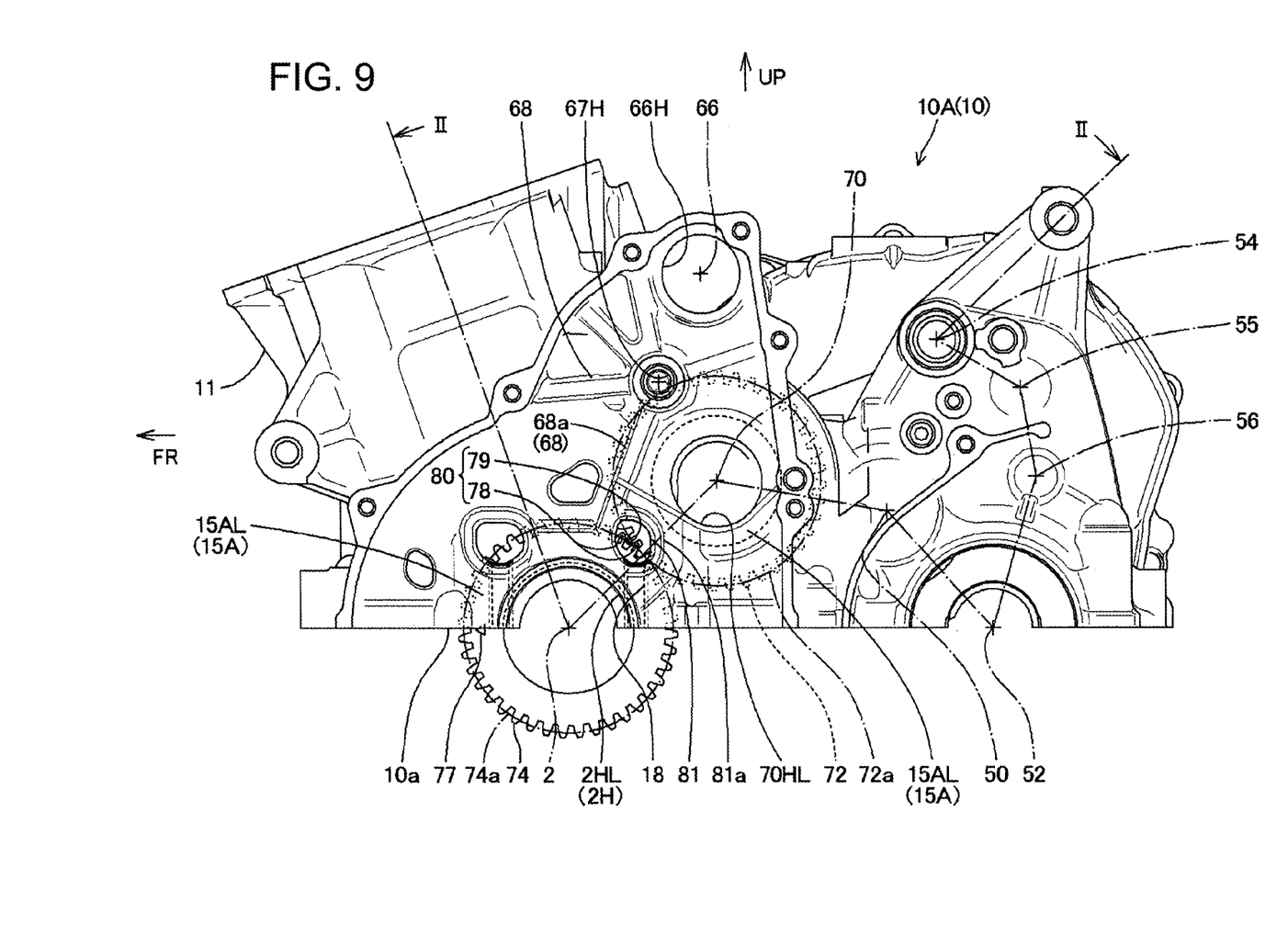
FIG. 9 is a left side elevational view as a viewed in a direction indicated by arrow marks IX-IX in FIG. 2 showing only an upper side crankcase, the balancer driving gear wheel and the balancer driven gear wheel shown in and taken out from FIG. 2. It is to be noted that, in FIG. 9, a line indicated by arrow marks II-II is a development divide line of FIG. 2.

Rotation of the starter motor 66 is reduced in speed by a starting speed reduction gear wheel not shown mounted in a speed reduction gear spindle attachment hole 67H of the upper side crankcase 10A shown in FIG. 9, and the rotation of the starting driven gear wheel 64 is transmitted to the crankshaft 2 through the one-way clutch 65 and the outer rotor 45a to start the internal combustion engine 1.

It is to be noted that, as shown in FIG. 9, a reinforcement rib 68 is provided on a left side outer face of the upper side crankcase 10A such that it extends around the speed reduction gear spindle attachment hole 67H and extends radially upwardly, downwardly, forwardly and rearwardly from around the speed reduction gear spindle attachment hole 67H.

It is to be noted that the internal combustion engine 1 of the present embodiment is a water-cooled internal combustion engine, and a pump shaft 26 shown in FIG. 1 is driven to rotation by a pump driving sprocket wheel 25 (refer to FIG. 2), which is supported for rotation on the main shaft 50 and rotates together with the primary driven gear wheel 61, through a driving chain and a driven sprocket wheel (not shown).

In the sectional plane shown in FIG. 1, an oil pump (not shown) is provided on the interior side of the figure while a water pump (not shown) is provided on this side of the figure. The oil pump sucks lubricating oil from the oil pan 14 through an intake conduit 27 and supplies the lubricating oil to various locations in the engine through an oil filter 28. The water pump circulates cooling water to a water cooling jacket 29 in the cylinder block 11 and the cylinder head 12 through cooling water lines and predetermined apparatus such as a radiator and a thermostat (not shown) to cool the internal combustion engine 1.

Further, as shown in FIGS. 1 to 3, in the internal combustion engine 1 of the present embodiment, the balancer mechanism 7 including the balancer shaft 70, which is supported for rotation in parallel to the crankshaft 2 at an oblique upper position with respect to the crankshaft 2, is provided on the upper side crankcase 10A. The balancer shaft 70 is supported for rotation on the left end side journal wall 15AL and the right end side journal wall 15AR, which form a pair of rear wall portions of the crankshaft 2, through a left bearing 71L and a right bearing 71R, respectively. In the present embodiment, the left bearing 71L and the right bearing 71R are ball bearings.

Further, as viewed in side elevation, the balancer shaft 70 is disposed above a line interconnecting the crankshaft 2 and the main shaft 50 between the crankshaft 2 and the main shaft 50.

A balancer driven gear wheel 72 is attached to the balancer shaft 70 between the left end side journal wall 15AL and the right end side journal wall 15AR, which form a pair of wall portions, in an opposing relationship to the inner face of the left end side journal wall 15AL, which is one of the wall portions. Further, two balance weight 73 are provided at positions corresponding to the crankpin portions 22 at two places of the crankshaft 2 in the axial direction with the phases thereof displaced by 180 degrees from each other in accordance with the two cylinders.

On the crankshaft 2, a balancer driving gear wheel 74 is fitted adjacent a left side face of the crank webs 48L from among four crank webs 48 in an opposing relationship to the inner faces of the left end side journal walls 15AL and 15BL, which are wall portions on one side, between the left end side journal walls 15AL and 15BL and the right end side journal walls 15AR and 15BR, which form a pair of wall portions.

It is to be noted that the diameter D1 of the pitch circle 74a of the balancer driving gear wheel 74 is equal to the diameter D2 of the pitch circle 72a of the balancer driven gear wheel 72.

Figure 5:
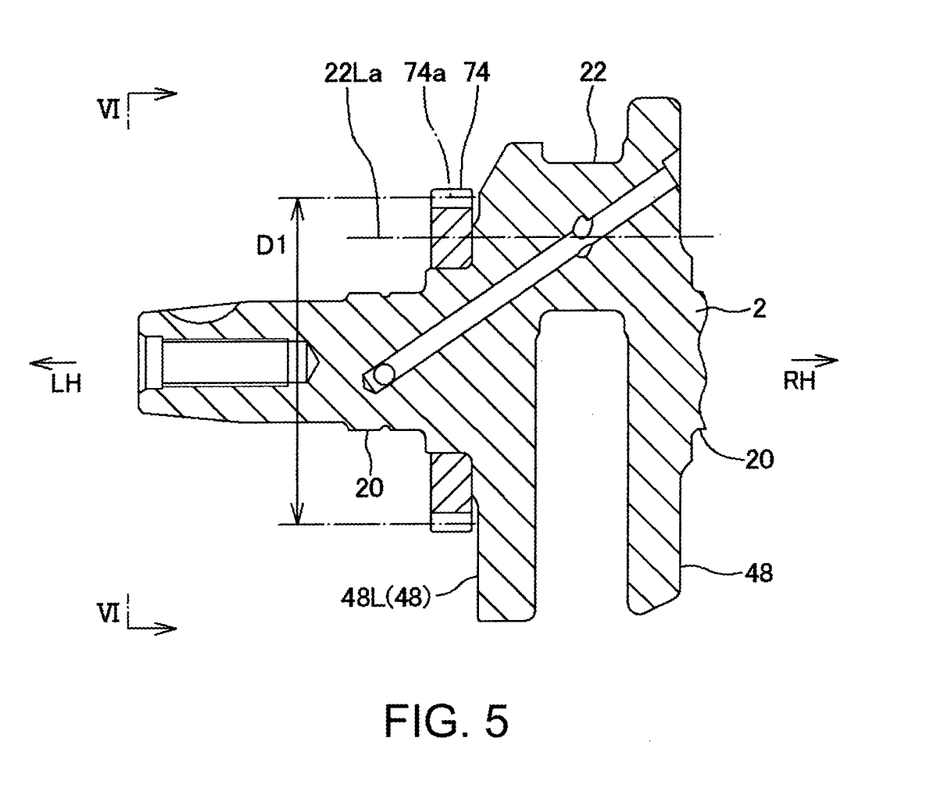
FIG. 5 is a sectional view taken in an axial direction showing a left end side of the crankshaft and a balancer driving gear wheel shown in and taken out from FIG. 2.
Figure 6:
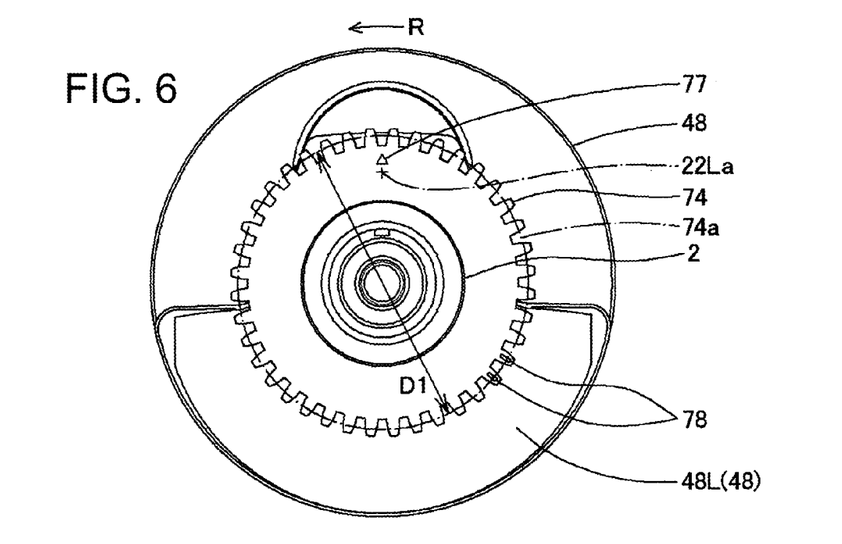
FIG. 6 is a view taken in a direction indicated by arrow marks VI-VI.

As the left end portion side of the crankshaft 2 and the balancer driving gear wheel 74 are shown in FIGS. 5 and 6, a driving gear wheel reference position mark 77 directed in the same direction as a displacement direction of the center axis 22La of the crankpin portion 22 on the left side with respect to the center axis of the crankshaft 2 is provided at a place near to the pitch circle 74a on a side face of the balancer driving gear wheel 74 fitted on the crankshaft 2, that is, on a side face opposing to the inner face of the left end side journal walls 15AL and 15BL. While, in the present embodiment, a triangular mark is applied, the mark may have any suitable shape and the application method may be a suitable method such as imprinting, punching or marking so that it can be visually observed readily.

On a side face of the balancer driving gear wheel 74 on the same side as the driving gear wheel reference position mark 77, a driving side mesh mark 78 indicative of a position at which the balancer driving gear wheel 74 meshes in a predetermined phase relationship with the balancer driven gear wheel 72 is applied to a place rather near to the pitch circle 74a on a side face of two teeth juxtaposed at a position on the rear side by a predetermined pitch in the rotational direction R upon operation from the driving gear wheel reference position mark 77, that is, on the side face of the balancer driving gear wheel 74. The mark may have any suitable shape and the application method may be a suitable method such as imprinting, punching or marking so that it can be visually observed readily.

Figure 7:
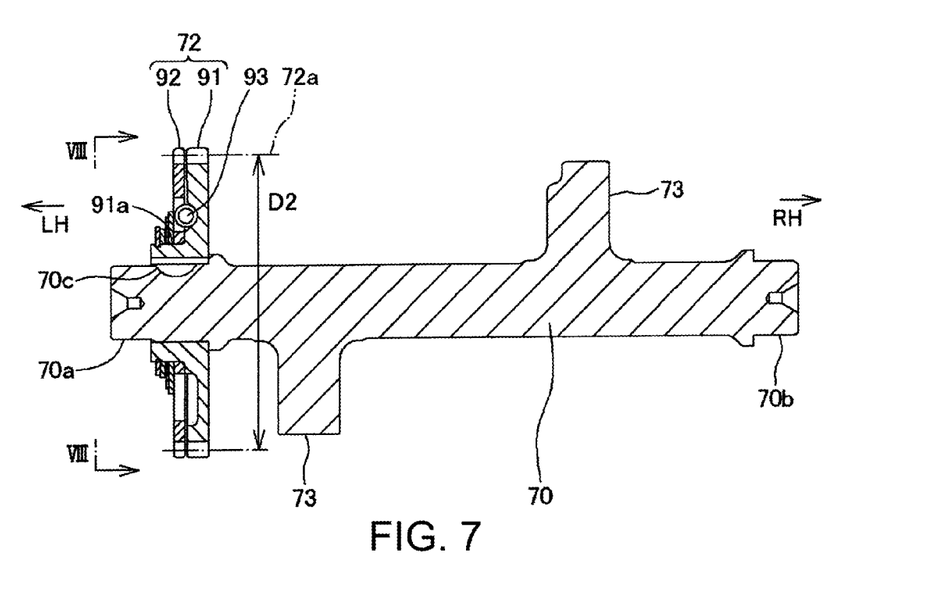
FIG. 7 is a sectional view in an axial direction of a balancer shaft and a balancer driven gear wheel shown in and taken out from FIG. 2.
Figure 8:
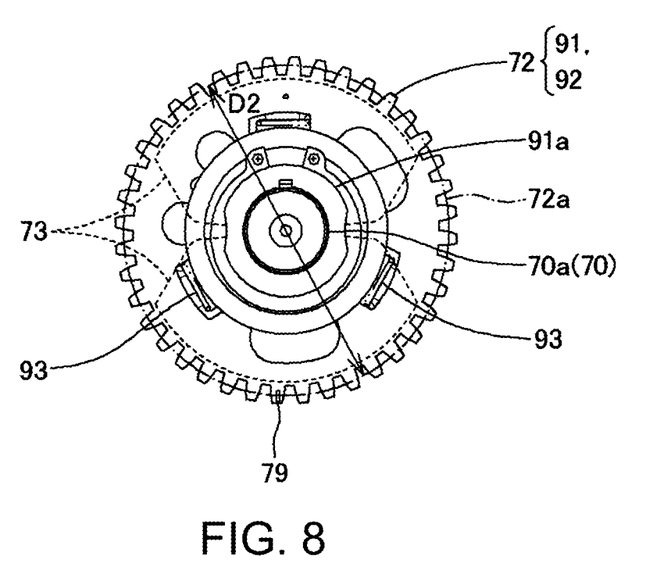
FIG. 8 is a view taken in directions indicated by arrow marks VIII-VIII in FIG. 7.

Meanwhile, as the balancer shaft 70 and the balancer driven gear wheel 72 are shown in FIGS. 7 and 8, a driven side mesh mark 79 indicative of a position at which the balancer driven gear wheel 72 meshes with the balancer driving gear wheel 74 is applied to a side face of one tooth at a position of a pitch which has a predetermined phase relationship with the position of the balance weights 73 at a place rather near to the pitch circle 72a on the left side face of the balancer driven gear wheel 72 secured to the balancer shaft 70 by a key 70c, that is, on a side face opposing to the inner face of the left end side journal wall 15AL. The mark may have any suitable shape and the application method may be a suitable method such as imprinting, punching or marking so that it can be visually observed readily.

When the driven side mesh mark 79 on the side face of the one tooth of the balancer driven gear wheel 72 is positioned between and meshes with the driving side mesh marks 78 on the side face of the two juxtaposed teeth of the balancer driving gear wheel 74, a positioning mark 80 formed from one set of marks provided on the side faces of the two gear wheels in the same direction is formed, and the balancer driving gear wheel 74 and the balancer driven gear wheel 72 are combined with each other in the predetermined phase relationship. As a result, the crankshaft 2 and the balance weights 73 of the balancer shaft 70 have the predetermined phase relationship with each other.

It is to be noted that the balancer driven gear wheel 72 in the present embodiment includes a so-called scissors mechanism.

In particular, the balancer driven gear wheel 72 has a two-part structure of a main gear wheel 91 and a sub gear wheel 92 in the gear wheel axial direction, and the main gear wheel 91 and the sub gear wheel 92, which has a smaller gear wheel width, are superposed with each other in the axial direction and both mesh with the balancer driving gear wheel 74 which is the other gear wheel.

The main gear wheel 91 is fixed supported on the balancer shaft 70 by the key 70c while the sub gear wheel 92 is fitted for free rotation on a boss 91a of the main gear wheel 91. The main gear wheel 91 and the sub gear wheel 92 have an equal diameter and an equal pitch and both mesh between the same teeth of the balancer driving gear wheel 74, and a biasing member 93 is interposed between the two gear wheels such that the gear wheels are biased to rotate in the opposite directions to each other.

When the balancer driving gear wheel 74 drives the balancer driven gear wheel 72 to rotate, a trailing face of a tooth of the main gear wheel 91 of the balancer driven gear wheel 72 in the rotation direction is contacted with and pushed by a leading face side of a tooth of the balancer driving gear wheel 74.

Meanwhile, although a backlash tends to appear on the front face side of the tooth of the main gear wheel 91, since the sub gear wheel 92 is biased to rotate in the opposite direction to that of the main gear wheel 91 by the biasing member 93, the leading face of the tooth of the sub gear wheel 92 is contacted with and pushes the trailing face side of the leading tooth of the balancer driving gear wheel 74 on the leading face side of the tooth of the main gear wheel 91 to substantially eliminate the backlash. Accordingly, since the balancer driven gear wheel 72 can mesh without a play in the meshing region thereof with the balancer driving gear wheel 74, generation of gear wheel noise or the like when rotational power is transmitted to the balancer driven gear wheel 72 can be prevented. This is particularly effective upon rotational power transmission with a rotational shaft that includes vibration components such as the crankshaft 2.

It is to be noted that, in the present embodiment, the primary driving gear wheel 24 includes a scissors mechanism as shown in FIG. 2. Although the primary driving gear wheel 24 is a driving side gear wheel conversely to the balancer driven gear wheel 72, the function of the scissors mechanism is similar.

In FIG. 9, only the upper side crankcase 10A, balancer driving gear wheel 74 and balancer driven gear wheel 72 in a state in which the balancer mechanism 7 is assembled are selectively shown.

Upon assembly, the crankshaft 2 and the balancer shaft 70 are assembled to the upper side crankcase 10A in a state in which the balancer driving gear wheel 74 and the balancer driven gear wheel 72 mesh with each other such that the driven side mesh mark 79 on the side face of the one tooth of the balancer driven gear wheel 72 is positioned between the driving side mesh marks 78 on the side face of the two juxtaposed teeth of the balancer driving gear wheel 74. In this state, the crankshaft 2 and the balancer shaft 70 have the predetermined phase relationship as described hereinabove.

A through-hole 81 is provided in the left end side journal wall 15AL in conformity with the position of the positioning mark 80 composed of the driving side mesh mark 78 (one of a "set of marks" in the present invention) and the driven side mesh mark 79 (the other of the "set of marks" in the present invention) when the driving gear wheel reference position mark 77 applied to the balancer driving gear wheel 74 attached to the crankshaft 2 is positioned on the parting face 10a of the upper side crankcase 10A and the lower side crankcase 10B in the state described above.

In particular, the through-hole 81 extending through the left end side journal wall 15AL is provided at the position of the left end side journal wall 15AL opposing to the positioning mark 80 in the state described above, at which the left end side journal wall 15AL opposes to both of the side faces of pitch circles 74a and 72a of the balancer driving gear wheel 74 and the balancer driven gear wheel 72. Accordingly, the positioning mark 80 can be visually observed straightly or directly from the outer side of the left end side journal wall 15AL through the through-hole 81.

In particular, even if the balancer driving gear wheel 74 and the balancer driven gear wheel 72 are disposed between the left end side journal wall 15AL and the right end side journal wall 15AR which configure a pair of wall portions of the crankcase 10, since the through-hole 81 for confirming the positioning mark 80 therethrough is disposed at a position of the left end side journal wall 15AL opposing to the positioning mark 80 which opposes to both of the side faces of the pitch circles 74a and 72a of the balancer driving gear wheel 74 and the balancer driven gear wheel 72, alignment of the positioning mark 80 for adjusting the timings (predetermined phase relationship) of both of the balancer driving gear wheel 74 and the balancer driven gear wheel 72 can be confirmed readily from the front through the through-hole 81. Accordingly, assembly of the balancer shaft 70 is facilitated, which contributes to accuracy in assembly and reduction in cost. The effects of the through-hole 81 are effective irrespective of the form of the crankcase of the internal combustion engine.

It is to be noted that, since the through-hole 81 is formed as an elongated circle elongated along a circumferential direction of the pitch circles 74a and 72a of the balancer driving gear wheel 74 and the balancer driven gear wheel 72, the confirmation can be carried out over a wide range and the confirmation of alignment of the positioning mark 80 is further facilitated.

Further, since the diameter D1 of the pitch circle 74a of the balancer driving gear wheel 74 is equal to the diameter D2 of the pitch circle 72a of the balancer driven gear wheel 72, the position of the through-hole 81 is disposed at equal distances from the center axis of the crankshaft 2 and the center axis of the balancer shaft 70, and the through-hole 81 is not one-sided to any of crankshaft left supporting hole crankshaft left supporting holes 2HL provided in the left end side journal walls 15AL and 15BL and crankshaft right supporting holes 2HR of the balancer shaft 70. Thus, the rigidity of the crankcase 10 is assured.

The crankcase 10 of the present embodiment is structured such that it is configured from two upper and lower parts across the parting face 10a centered at the crankshaft 2, and the balancer shaft 70 is supported for rotation on the upper side crankcase 10A in a spaced relationship from the parting faces 10a.

Accordingly, the through-hole 81 positioned intermediately between the crankshaft 2 and the balancer shaft 70 can be formed as a closed hole spaced from the parting faces 10a and does not have a cutaway shape as in the case where a through-hole is provided between the parting faces 10a. Therefore, the rigidity of the crankcase 10 is assured.

It is to be noted that, since the crankcase 10 in the present embodiment is not structured such that it is formed from two left and right parts separate from each other, although there is the possibility that it may become difficult to observe the meshing region between the balancer driving gear wheel 74 and the balancer driven gear wheel 72 directly from the opposite side of the crankcase to confirm alignment of the positioning mark, since the through-hole 81 is provided as in the present embodiment, it becomes possible to visually observe the meshing region between the balancer driving gear wheel 74 and the balancer driven gear wheel 72 in the crankcase 10 of the structure including two upper and lower parts in the present embodiment to easily confirm alignment of the positioning mark 80.

Further, as seen in FIG. 9, the outer periphery of the through-hole 81 is surrounded by a rib 81*a* and the surroundings of the through-hole 81 are reinforced to achieve enhancement in strength of the crankcase 10. Further, the rib 81*a* surrounding the outer periphery of the through-hole 81 connects, around the through-hole 81, to a vertical rib 68*a* extending in the upward and downward direction from within a reinforcement rib 68 for the speed reduction gear spindle attachment hole 67H of the left end side journal wall 15AL, and the rib 81*a* surrounding the through-hole 81 is further reinforced.

It is to be noted that female threaded holes 18 for the stud bolts 17 for fastening the upper side crankcase 10A and the lower side crankcase 10B to each other are provided in an upwardly directed state from the parting face 10*a* in the front and rear of the crankshaft left supporting hole 2HL of the left end side journal wall 15AL as shown in FIG. 9, and an end of the female threaded holes 18 in the rear extends to the through-hole 81.

Therefore, upon working of the female threads, cut chips can be removed readily, and therefore, the working is facilitated. Further, by screwing and tightening of the stud bolts 17, the stress concentration acting around the female threaded holes 18 can be reduced, and improvement in strength of the crankcase 10 is achieved. It is to be noted that, for this object, also an end of the female threaded holes 18 extends to another through-hole.

Further, the through-hole 81 is formed by casting through upon casting of the upper side crankcase 10A, and such casting through formation eliminates mechanical working and decreases the man-hour in working and the man-hour required to produce the crankcase.

In the internal combustion engine 1 of the present embodiment, since the balancer shaft 70 and the main shaft 50 are supported on the upper side crankcase 10A above the parting face 10*a* of the crankcase 10, attachment utilizing the parting face 10*a* cannot be carried out.

Therefore, the right shaft end portion 70*b* of the balancer shaft 70 is supported on the right end side journal wall 15AR by operating, in a state in which the right shaft end portion 70*b* is loosely fitted in a balancer shaft right supporting hole 70HR of the right end side journal wall 15AR which forms the right side wall portion from between a pair of wall portions of the crankcase 10, a left shaft end portion 70*a* to be supported on the balancer shaft left supporting hole 70HL of the left end side journal wall 15AL, which serves as the left side wall portion though the left bearing 71L, and then inserting and fitting the right bearing 71R onto the right shaft end portion 70*b* of the balancer shaft 70 from the right side into the balancer shaft right supporting hole 70HR.

Also the right shaft end portion 50*b* of the main shaft 50 is supported on the right end side journal wall 15AR by operating, in a state in which the right shaft end portion 50*b* is loosely fitted in the main shaft right supporting hole 50HR of the right end side journal wall 15AR, which forms the right side wall portion from between a pair of wall portions of the crankcase 10, a left shaft end portion 50*a* to be supported on the main shaft left supporting hole 50HL of the left end side journal wall 15AL, which serves as the left side wall portion though the left bearing 51L, and then inserting and fitting the right bearing 51R onto the right shaft end portion 50*b* of the main shaft 50 from the right side into the main shaft right supporting hole 50HR.

In other words, not only the balancer shaft 70 but also the main shaft 50 are supported for rotation at the right shaft end portions 70*b* and 50*b* on the right bearings 71R and 51R, which are fitted in and secured to the right supporting holes 70HR and 50HR of the right end side journal wall 15AR, respectively. Accordingly, although the right bearings 71R and 51R are fitted from the right side into and secured to the right end side journal wall 15AR which is the right side wall portion, it is necessary to prevent inadvertent coming off thereof by vibration or the like upon operation of the internal combustion engine 1, and a bearing restriction member 100 is attached to a right face of the right end side journal wall 15AR.

In the present embodiment, the bearing restriction member 100 is formed in such a shape that, as shown in FIG. 4, it is disposed, in an attached state thereof, along a side face rather near to an outer periphery of the right bearing 71R of the balancer shaft 70 and extends to and is disposed on a side face rather near to an outer periphery of the right bearing 51R of the main shaft 50. Thus, the bearing restriction member 100 serves also as a bearing restriction member for the main shaft 50 and is fastened to the right face of the right end side journal wall 15AR by bolts 101 (refer also to FIGS. 10 and 11).

Therefore, the bearing restriction member 100 can be used also as a bearing restriction member for the right bearing 51R of the main shaft 50 without providing the latter separately, which makes it possible to reduce the number of parts.

Further, as shown in FIG. 3, the shift fork supporting shaft 56 is fitted from the right side in and extends through a shift fork supporting shaft right supporting hole 56HR of the right end side journal wall 15AR until a left shaft end portion 56*a* thereof is fitted in and supported by a shift fork supporting shaft left supporting hole 56HL of the left end side journal wall 15AL while a right shaft end portion 56*b* is supported on the right end side journal wall 15AR which is a right side wall portion of the crankcase 10 by the shift fork supporting shaft right supporting hole 56HR.

Figure 10:
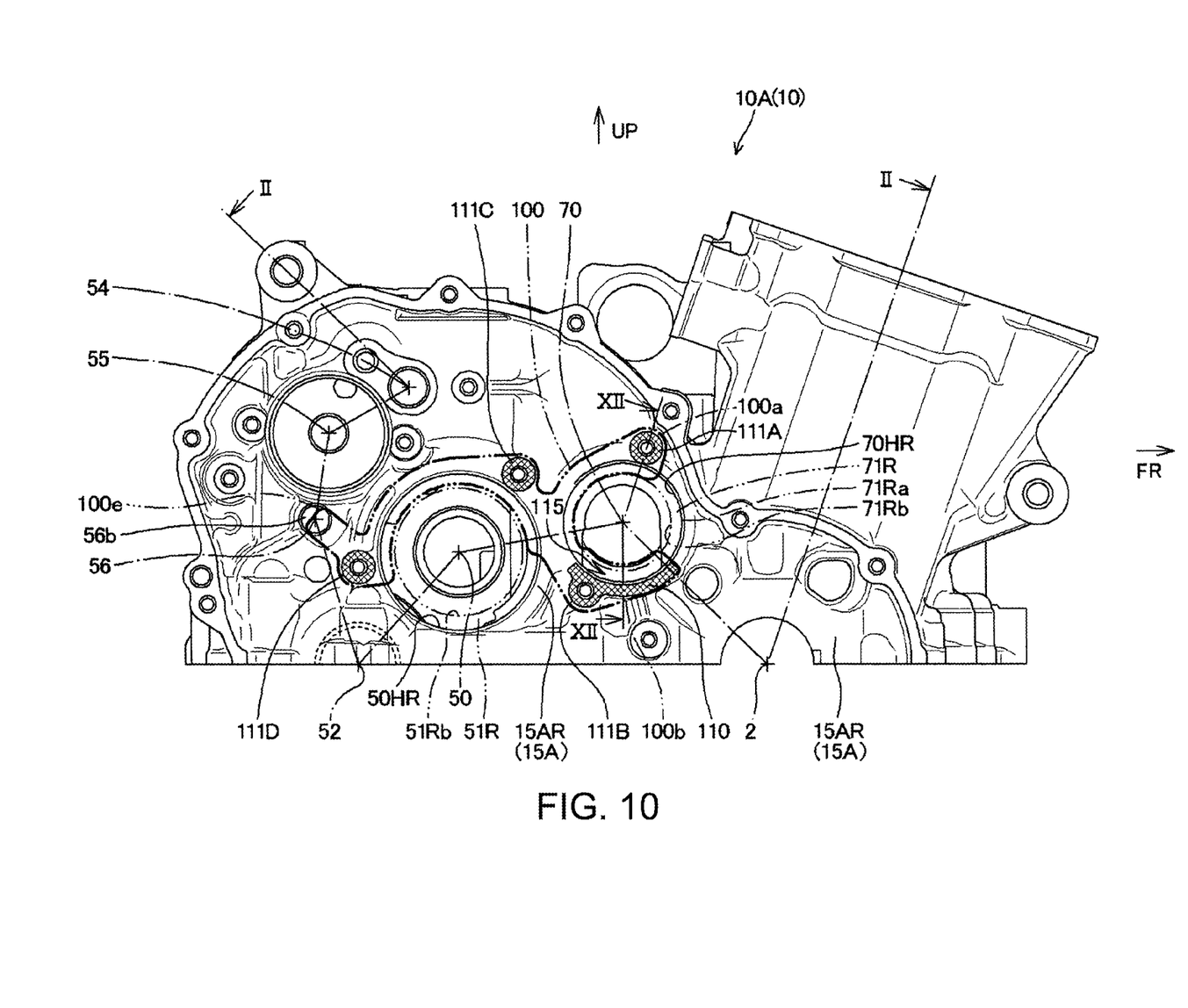
FIG. 10 is a right side elevational view as a view indicated by an arrow mark X-X in FIG. 2 and showing only the upper side crankcase shown in and taken out from FIG. 2 and shows the position of an oil receiving section. It is to be noted that, in FIG. 10, a line indicated by arrow marks II-II is a development divide line of FIG. 2. Further, a bearing restricting member in an attached state is indicated by a thick alternate long and two short dashes line.
Figure 11:
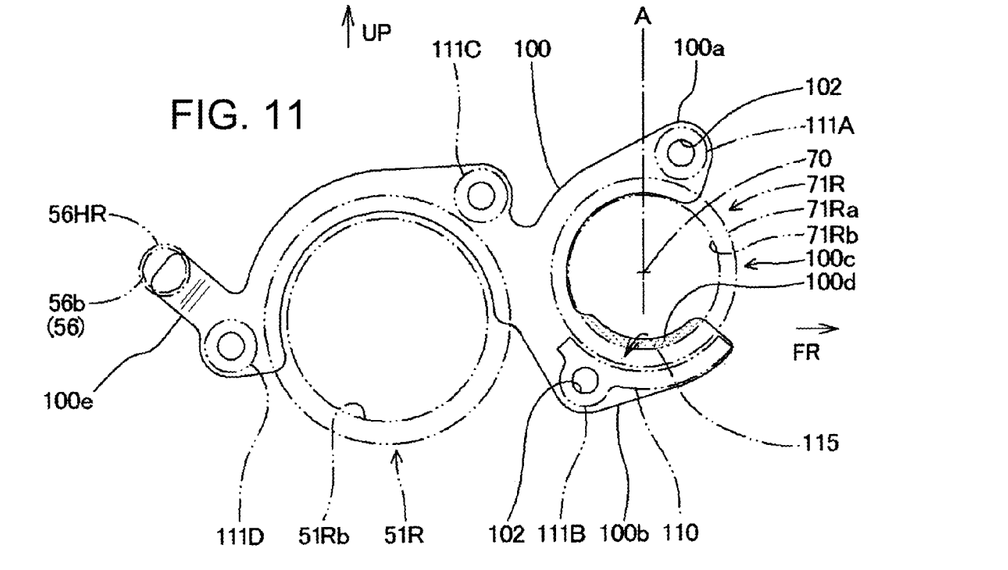
FIG. 11 is a front elevational view of the bearing restricting member which is indicated by the thick alternate long and two short dashes lines in FIG. 10 when it is in the attached state.

Accordingly, although it is necessary for the shift fork supporting shaft 56 to be provided with coming off preventing device for restricting the right shaft end portion 56*b* thereof in order to prevent inadvertent coming off of the same, in the present embodiment, the bearing restriction member 100 is formed such that, in an attached state thereof, it extends to the right shaft end portion 56*b* of the shift fork supporting shaft 56 such that a rear end extension 100*e* thereof contacts with the right shaft end portion 56*b* (refer also to FIGS. 3, 10 and 11).

Therefore, the bearing restriction member 100 can be used also as the coming off preventing device for the shift fork supporting shaft 56 without providing the same separately, which makes it possible to reduce the number of parts.

In an internal combustion engine wherein the crankcase 10 is formed as a crankcase of an upper and lower two-part configuration and the oil pan 14 is provided at a lower portion of the crankcase 10 while the balancer shaft 70 and the main shaft 50 are provided on the upper side crankcase 10A like the internal combustion engine 1 of the present embodiment, it is difficult to carry out lubrication in such a manner that some of the bearings and gear wheels of the speed change gear 5 are dipped in oil, and supply of lubricating oil by an oil pump is carried out.

Also in the present embodiment, in the main shaft 50 of the speed change gear 5, an oil passage 50c to which oil is supplied from the oil pump is provided as oil supplying device in order to lubricate the left and right bearings 51L and 51R, speed change gear wheel group 50g and so forth. However, in the internal combustion engine 1 of the present embodiment, a lubrication structure for a bearing section wherein an oil receiving portion 110 is provided in the right end side journal wall AR which is a right side wall portion of the crankcase 10 is provided for the bearing portions for the balancer shaft 70.

In particular, as shown in FIG. 10, the oil receiving portion 110 formed in a swollen state like a trapezoidal shape to a fixed height along an outer periphery 71Ra is provided on a right face of the right end side journal wall 15AR on the outer side of an outer periphery 71Ra below the center axis of the right bearing 71R. Further, the bearing restriction member 100 for suppressing coming off of the right bearing 71R is provided on the side face of an outer race portion 71Rb of the right bearing 71R as described hereinabove. The oil receiving portion 110 extends along the outer periphery 71Ra on the right end side journal wall 15AR below the center axis of the right bearing 71R and is formed in an arcuate shape which is concave in an upward direction.

Meanwhile, boss portions 111A, 111B, 111C and 111D of fastening device for the bearing restriction member 100 in the form of a plate are formed in order at positions above and below the balancer shaft 70 and on the front and the rear of the main shaft 50 on the right face of the right end side journal wall 15AR. The bearing restriction member 100 is fastened to the boss portions by bolts 101 (refer to FIG. 4) fitted in attachment holes 102 (refer to FIG. 11) in the boss portions to secure the bearing restriction member 100 to the right face of the oil receiving portion 110.

Although the bearing restriction member 100 has a function for preventing coming off of the right bearing 71R, in a state in which the bearing restriction member 100 is attached to the oil receiving portion 110, an oil reserve section 115 (refer to FIGS. 11 and 12) is formed over the oil receiving portion 110 and the bearing restriction member 100 and can accumulate oil therein, which makes lubrication of the right bearing 71R possible.

Further, since the bearing restriction member 100 is formed such that it extends toward the center axis of the right bearing 71R of the balancer shaft 70 from the oil receiving portion 110 and extends along a side face rather near to the outer periphery 71Ra of the right bearing 71R, the capacity of the oil reserve section 115 increases, and oil supply to the right bearing 71R is carried out more preferably.

Figure 12:
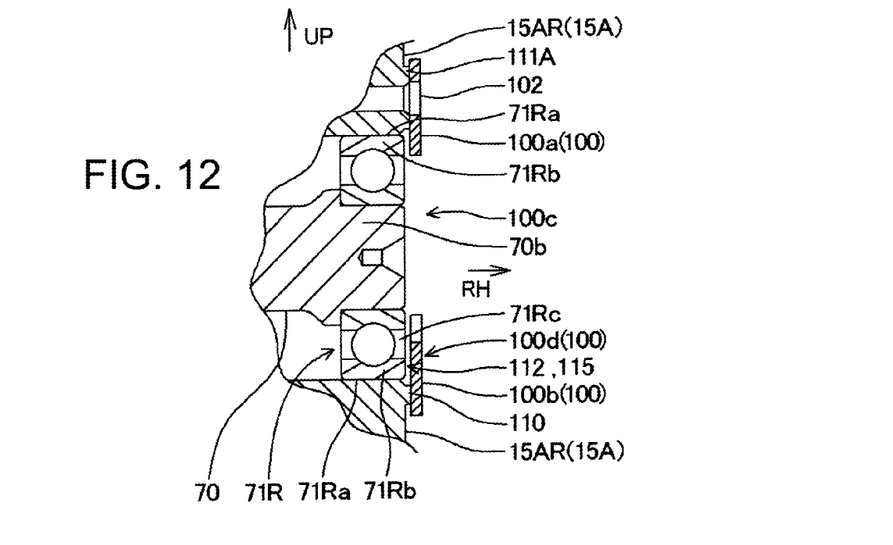
FIG. 12 is an explanatory view corresponding to a sectional view taken along line XII-XII in FIG. 10 and schematically illustrating an attached state of a main shaft, the oil receiving section around a main shaft right bearing, and the bearing restricting member.

In particular, if an attachment state of the right bearing 71R, oil receiving portion 110 and bearing restriction member 100 to the right shaft end portion 70b of the balancer shaft 70 is schematically shown in FIG. 12, then since the bearing restriction member 100 secured to the right face of the oil receiving portion 110 by fastening is a coming off preventing member in the case where a bearing fitted therein becomes loose, the bearing restriction member 100 does not press against the outer race portion 71Rb of the right bearing 71R, and between the bearing restriction member 100 and the side face of the outer race portion 71Rb, a fixed gap 112 exists in accordance with the swell of the oil receiving portion 110 and the oil reserve section 115 is formed.

Therefore, lubricating oil scattered between the crankcase 10 and the right crankcase cover 47R and sticking to the surface of the right end side journal wall 15AR flows down along the wall face and is accumulated into the gap 112 between the side face rather near to the outer periphery 71Ra of the right bearing 71R and the bearing restriction member 100, that is, in the oil reserve section 115 and besides flows into the right bearing 71R, whereby lubrication of the bearing section of the balancer shaft 70 is permitted.

Accordingly, the lubrication structure for the bearing section including the simple oil supplying device that can utilize the bearing restriction member 100 to lubricate the right bearing 71R of the balancer shaft 70 without providing special oil supplying means is obtained. Further, since the oil receiving portion 110 is formed in an arcuate shape that is concave upwardly along the outer periphery 71Ra of the right bearing 71R, the oil amount to be accumulated in the oil reserve section 115 can be increased.

Further, the bearing restriction member 100 is formed such that the portion thereof which extends farther than the oil receiving portion 110 toward the center axis of the right bearing 71R has a center side extension 100d which extends farther than the outer race portion 71Rb of the right bearing 71R secured to the right end side journal wall 15AR to the center axis side of right bearing 71R (refer to FIGS. 11 and 12). Accordingly, oil is supplied positively to a sliding location of a ball rolling portion 71Rc of the right bearing 71R by the center side extension 100d extending toward the center axis side of the bearing farther than the outer race portion 71Rb of the right bearing 71R, and the lubrication is carried out more preferably.

Further, as shown in FIGS. 10 and 11, a boss portion 111A of the fastening device for attaching the bearing restriction member 100 to the right end side journal wall 15AR above the balancer shaft 70 is disposed in a displaced relationship from just above (in FIG. 11, the direction indicated by an arrow mark A) the center axis of the right bearing 71R of the balancer shaft 70. Where the boss portion 111A above the balancer shaft 70 is positioned just above A of the center axis of the right bearing 71R, there is the possibility that inflow of oil into the oil receiving portion 110 may be obstructed. However, in the present embodiment, such a defect as just described is suppressed and stabilized lubrication is obtained.

Further, the bearing restriction member 100 extends upwardly and downwardly with respect to the balancer shaft 70, and on the rear side, the upper portion 100a and the lower portion 100b thereof connect to each other and the bearing restriction member 100 further extends upwardly with respect to the main shaft 50. However, on the front side of the balancer shaft 70, a portion of the bearing restriction member 100 between the upper portion 100a and the lower portion 100b with respect to the balancer shaft 70 forms a cutaway portion 100c (refer to FIG. 11) which is cut away. If the bearing restriction member 100 is formed annularly around the balancer shaft 70, then there is the possibility that oil may flow down along around the annular portion and may not readily enter the bearing restriction member 100. However, in the present embodiment, since the portion of the bearing restriction member 100 between the upper portion 100a and the lower portion 100b is cut away and forms the cutaway portion 100c, it is easy for oil to flow from the cutaway portion 100c into the oil receiving portion 110, and stabilized lubrication is obtained.

It is to be noted that the lower boss portion 111B of the balancer shaft 70 described above for fastening the bearing restriction member 100 is formed integrally with the oil receiving portion 110 on the right end side journal wall 15AR (refer to FIGS. 10 and 11), and by the integration of the boss portion 111B of the fastening device, the rigidity around the oil receiving portion 110 is enhanced.

While an internal combustion engine with a balancer of an embodiment of the present invention has been described, the present invention naturally includes different modes from the embodiment without departing from the subject matter of the claims.

For example, the internal combustion engine with a balancer is not limited to the water-cooled straight two-cylinder four-stroke cycle internal combustion engine of the embodiment described above but may be an internal combustion engine having the configuration of claim 1, and where the internal combustion engine with a balancer is incorporated in a vehicle, the vehicle is not limited to a motorcycle and the internal combustion engine with a balancer is not limited to an internal combustion engine for being incorporated in a vehicle.

Further, except claim 3 and those cases in which claim 3 is cited in other claims, the crankcase is not limited to that of a structure wherein it is formed from two upper and lower parts separate along a parting face 3a centered at the crankshaft, but the present invention is applied effectively also to a case of a crankcase of a different structure, for example, to a case of a crankcase structured such that it is composed of two left and right parts. However, the effect of the present invention is remarkable specifically in the case of a crankcase composed of two upper and lower parts.

DESCRIPTION OF REFERENCE SYMBOLS

1 ... Internal combustion engine (internal combustion engine with a balancer), 2 ... Crankshaft, 5 ... Speed change gear, 7 ... Balancer mechanism, 10 ... Crankcase, 10a ... Parting face, 10A ... Upper side crankcase, 10B ... Lower side crankcase, 11 ... Cylinder block, 12 ... Cylinder head, 13 ... Cylinder head cover, 14 ... Oil pan, 15AL ... Left end side journal wall (left side wall portion from between a pair of wall portions), 15BL ... Left end side journal wall (left side wall portion from between a pair of wall portions), 15AR ... Right end side journal wall (right side wall portion from between a pair of wall portions), 15BR ... Right end side journal wall (right side wall portion from between a pair of wall portions), 17 ... Stud bolt (fastening bolt), 18 ... Female threaded hole, 22 ... Crankpin portion, 22La ... Enter axis of the left side crankpin portion, 47R ... Right crankcase cover, 48 ... Crank web, 48L ... Left end side crank web, 50 ... Main shaft, 52 ... Countershaft, 60 ... Friction clutch, 67H ... Speed reduction gear spindle attachment hole, 68a ... Vertical rib, 70 ... Balancer shaft, 72 ... Balancer driven gear wheel, 72a ... Pitch circle (of the balance driven gear wheel), 73 ... balance weight, 74 ... Balancer driving gear wheel, 74a ... Pitch circle (of the balancer driving gear wheel), 77 ... Driving gear wheel reference position mark (one of a set of marks), 78 ... Driving side mesh mark (the other of the set of marks), 79 ... Driven side mesh mark, 80 ... Positioning mark, 81 ... Through-hole, 81a ... Rib

What is claimed is:

1. An internal combustion engine with a balancer comprising:
a crankcase having a pair of wall portions;
a crankshaft supported for rotation by the wall portions and having a balancer driving gear wheel provided integrally thereon;
a balancer shaft supported for rotation by the wall portions and having a balancer driven gear wheel provided integrally thereon, wherein the balancer driving gear wheel and the balancer driven gear wheel are disposed between the wall portions and wherein the crankcase is formed from upper and lower parts with respect to a parting face centered at the crankshaft and the balancer shaft is supported on one of the upper side crankcase and the lower side crankcase in a displaced relationship from the parting face;
a positioning mark, which includes a set of marks provided on side faces in a same direction of the driving and driven gear wheels, is disposed near to pitch circles of the balancer driving gear wheel and the balancer driven gear wheel; and
a through-hole is formed in one of said pair of wall portions at a position that opposes the positioning mark on the pitch circles of the balancer driving gear wheel and the balancer driven gear wheel, said through-hole extending through the one wall portion such that the positioning mark can be visually observed from outside of the one side wall through the through-hole, wherein an end of a female threaded hole for a fastening bolt for fastening the upper side crankcase and the lower side crankcase extends into the through-hole.

2. The internal combustion engine with the balancer according to claim 1, wherein the through-hole is an elongated circle elongated along a circumferential direction of the pitch circles of the balancer driving gear wheel and the balancer driven gear wheel.

3. The internal combustion engine with the balancer according to claim 1, wherein an outer periphery of the through-hole is surrounded by a rib.

4. The internal combustion engine with the balancer according to claim 3, wherein the rib surrounding the outer periphery of the through-hole connects to a vertical rib that extends in an upward and downward direction of the one side wall around the outer periphery of the through-hole.

5. The internal combustion engine with the balancer according to claim 1, wherein the through-hole is formed by casting through.

6. The internal combustion engine with the balancer according to claim 1, wherein the through-hole is an elongated circle elongated along a circumferential direction of pitch circles of the balancer driving gear wheel and the balancer driven gear wheel.

7. The internal combustion engine with the balancer according to claim 1, wherein an outer periphery of the through-hole is surrounded by a rib.

8. The internal combustion engine with the balancer according to claim 7, wherein the rib surrounding the outer periphery of the through-hole connects to a vertical rib that extends in an upward and downward direction of the one side wall around the outer periphery of the through-hole.

* * * * *